(12) United States Patent
Negro

(10) Patent No.: US 9,298,963 B2
(45) Date of Patent: Mar. 29, 2016

(54) MARK READER WITH REDUCED TRIGGER-TO-DECODE RESPONSE TIME

(75) Inventor: James A. Negro, Arlington, MA (US)

(73) Assignee: COGNEX CORPORATION, Natick, MA (US)

(*) Notice: Subject to any disclaimer, the term of this patent is extended or adjusted under 35 U.S.C. 154(b) by 1289 days.

(21) Appl. No.: 12/978,156

(22) Filed: Dec. 23, 2010

(65) Prior Publication Data

US 2012/0160918 A1    Jun. 28, 2012

(51) Int. Cl.
*G06K 7/10* (2006.01)
*G06K 7/14* (2006.01)

(52) U.S. Cl.
CPC .......... *G06K 7/1439* (2013.01); *G06K 7/10722* (2013.01); *G06K 7/10881* (2013.01)

(58) Field of Classification Search
CPC .......... G06K 7/10752; G06K 7/10544; G06K 7/1439; G06K 7/10811
USPC .......... 235/454, 455, 462.01–462.45, 462.48, 235/470, 472.01; 382/255
See application file for complete search history.

(56) References Cited

U.S. PATENT DOCUMENTS

| | | |
|---|---|---|
| 4,818,886 A | 4/1989 | Drucker |
| 5,117,098 A | 5/1992 | Swartz |
| 5,280,162 A | 1/1994 | Marwin |
| 5,302,812 A | 4/1994 | Li et al. |
| 5,600,121 A | 2/1997 | Kahn et al. |
| 5,612,529 A | 3/1997 | Coleman |
| 6,123,261 A | 9/2000 | Roustaei |
| 6,138,915 A | 10/2000 | Danielson et al. |
| 6,230,975 B1 | 5/2001 | Colley et al. |
| 6,695,209 B1 | 2/2004 | La |
| 6,729,546 B2 | 5/2004 | Roustaei |
| 7,097,102 B2* | 8/2006 | Patel et al. ............. 235/454 |
| 7,347,374 B2 | 3/2008 | Zhu et al. |
| 7,389,933 B2 | 6/2008 | Wang |
| 7,594,609 B2 | 9/2009 | Kotlarsky et al. |
| 7,611,060 B2 | 11/2009 | Wang et al. |
| 7,740,176 B2 | 6/2010 | Wang et al. |
| 8,387,884 B2* | 3/2013 | Vinogradov ......... 235/462.42 |
| 2001/0027999 A1* | 10/2001 | Lee ..................... 235/462.45 |
| 2003/0168512 A1 | 9/2003 | Longacre, Jr. et al. |
| 2007/0002163 A1* | 1/2007 | Madej et al. ............. 348/362 |
| 2010/0187315 A1* | 7/2010 | Goren et al. .......... 235/462.42 |
| 2012/0248195 A1* | 10/2012 | Feng et al. ............ 235/472.01 |
| 2013/0221104 A1* | 8/2013 | Wang ................... 235/462.25 |
| 2014/0204268 A1* | 7/2014 | Grunow et al. ........... 348/370 |

FOREIGN PATENT DOCUMENTS

| | | |
|---|---|---|
| EP | 0548451 A2 | 5/1992 |
| EP | 1916557 A1 | 4/2008 |

* cited by examiner

*Primary Examiner* — Thien M Le
*Assistant Examiner* — April Taylor
(74) *Attorney, Agent, or Firm* — Quarles & Brady LLP

(57) ABSTRACT

Systems and methods for use with a handheld mark reader that reduce the time between activation of the reader's trigger and the reader returning a successful decode response. Image processing may be performed prior to the user actuating the trigger and thus obtaining a decodable image with reduced delay. Separate pre-trigger and post-trigger parameters may be used for image decoding. A feedback loop may be incorporated for repeated parameter updates. An adjustable lens may be utilized either with illumination OFF or ON.

25 Claims, 6 Drawing Sheets

MARK READER WITH REDUCED TRIGGER-TO-DECODE RESPONSE TIME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the field of mark or symbology readers used to read marks (e.g., symbols, barcodes, text characters including alphanumeric, kanji, etc.) directly on objects, and more specifically to a reader that is configured to reduce the time between activation of the reader's trigger and the reader returning a successful decode response.

Mark or symbology reading (also commonly termed barcode scanning) entails the aiming of an image acquisition sensor (e.g., CMOS camera, CCD, etc.) or vision system (e.g., VSoC) contained within the reader at a location on an object that contains a mark, and acquiring an image of the mark. Marks are known and available in a variety of shapes and sizes, and are designed to contain a set of predetermined patterns that represent an ordered group of characters or shapes. The reader, including an attached data processor (e.g., a microcomputer), can derive useful information about the scanned object (e.g., its serial number, type, model, price, etc.) from the mark.

A handheld reader may be directed to step through various types of image capture parameters when reading each mark, such as adjustments to exposure/gain and/or cycling different illuminators ON and OFF, but this takes time, as does integrating/analyzing the resulting images. Generally, for a reader to be considered efficient, the reading process should take place within 200 milliseconds or less. Stepping through adjustments to exposure/gain and/or illumination types, storing results, comparing, and deriving the a suitable image may exceed desired time limits.

Referring to FIG. 1, the image decoding process in known symbology readers typically works in the following way. The user initiates the image decoding process by actuating a trigger on a handheld symbology reader, as indicated at process block 50. At this point, the reader may or may not be pointing at the mark to be decoded. By actuating the trigger, an illumination source on or within the reader is turned ON at process block 52 to illuminate the mark to be decoded. The user points the reader and associated illumination at the mark to be decoded so as to cause the illumination to reflect off of the intended mark and back to the reader and onto, i.e., to expose, an image acquisition sensor within the reader to acquire an image of the mark, as indicated at process block 54. Optionally, in addition to acquiring the image, the sensed image may be transferred to a memory (e.g., SDRAM), for storage.

Next, a data processor executes a predetermined algorithm on the stored image data to analyze the image, as indicated at process block 56. The algorithm determines if the image data is acceptable (e.g., meets predetermined threshold values for contrast or sharpness, for example) to attempt decoding the image data, or if modifications are needed to sensor parameters (e.g., exposure/gain) and/or other reader parameter settings (e.g., focus, illumination), as indicated at decision block 58. If modifications are needed, the new sensor and/or other reader parameter settings may be calculated and updated, as indicated at process block 60. As indicated at process block 62, a time delay may need to be inserted for the new parameters to take effect e.g., a rolling shutter sensor may need to complete one readout from every sensor "line" (i.e., row of image pixels).

The process of acquiring an image may be repeated at process block 54, now with the new parameters, and again, the algorithm determines if the image data is acceptable to attempt decoding the image data. If the image data is now acceptable, the image data may be decoded or analyzed for the presence of encoded data mark, as indicated at process block 64.

If data encoded within the mark is found and successfully decoded, as indicated at decision block 66, the reader typically will transmit the decoded data by outputting the decoded data (or a variation thereof), and/or actuating some form of user feedback such as a beeper and/or status lights, and turn the illumination OFF, as indicated at process block 68. The process may then be repeated upon activation of the trigger by the user. If the decoding step does not result in a decoded image, the process typically returns to process block 54 to acquire another image for analysis.

While this solution works well in some applications, one drawback to the above described decode process is the extent of time between the user actuating the trigger to initiate the image decoding process and the eventual successful processing of an image. For example, typical sensor to memory transfer times may be about 17 ms (using for example a global sensor APTINA MT9V024), to 33 ms (using for example a rolling shutter APTINA MT9M001). Parameter update delay typical times may be about 5 ms (global sensor) to 33-66 ms (rolling shutter). It is not uncommon for the parameter update process to be repeated at least three to six times, or more, which can result in an undesirable delay of a few hundred milliseconds or more. Moreover, it is recognized that certain aspects of the mark itself can make it difficult to detect or decode it within a limited number of capture events.

A valued usability metric for handheld readers is the trigger-to-decode response time, or the time between the user actuating the trigger to initiate the image decoding process and the reader returning a successful decode response. What is needed is a mark reader with a reduced trigger-to-decode response time.

BRIEF SUMMARY OF THE INVENTION

The present invention overcomes the disadvantages of the prior art by providing improved systems and methods for reducing the trigger-to-decode response time by performing some image processing prior to the user actuating the trigger and thus obtaining a decodable image with reduced delay.

Accordingly, some embodiments comprise a handheld mark reader. The reader comprises a manual trigger and an image acquisition sensor. The sensor acquires at least one pre-trigger image of the mark and at least one post-trigger image of the mark. A pre-trigger calculation process calculates, for the at least one pre-trigger image, at least one pre-trigger image parameter, and a decode process decodes the at least one post-trigger image. A feedback process uses the at least one pre-trigger image parameter to control at least one of a post-trigger image acquisition process and the decode process.

Other embodiments also comprise a handheld mark reader for reading a mark. The mark reader comprises a reader body supporting a manual trigger and an image acquisition sensor, the sensor configured to acquire a pre-trigger image of the mark and a post-trigger image of the mark. A pre-trigger image acquisition process is included, along with a first pre-trigger calculation process that calculates, for the pre-trigger image, at least one parameter of exposure and gain. A first decode process attempts to decode the pre-trigger image. A post-trigger image acquisition process is included, along with a second decode process that attempts to decode the post-trigger image. A feedback process uses the first calculated at least one parameter to control at least one of the post-trigger image acquisition process and the second decode process.

Yet other embodiments comprise a mark reader for decoding an image. The reader comprises a body, and an imager sensor within the body, the image sensor configured to acquire a pre-trigger image of at least a portion of a mark. The body supports a manually operable trigger, the trigger configured to activate the image sensor to acquire a post-trigger image of the at least a portion of the mark. A processor is coupled to the trigger and the image sensor, the processor configured to activate the image sensor prior to operation of the trigger to acquire the pre-trigger image of the at least a portion of the mark and to calculate, for the pre-trigger image acquired prior to operation of the trigger, at least one of auto-exposure, auto-gain, auto-focus, and image decode. The processor is further configured to decode the post-trigger image acquired after activation of the trigger using at least one of the calculated auto-exposure, auto-gain, auto-focus, and image decode.

Consistent with the above, some embodiments include a method for decoding an image of a mark using a handheld mark reader, with the reader including a trigger configured to initiate an acquisition of the image of the mark. The method comprises a variety of steps including a) providing a processor, the processor coupled to the trigger and to an image acquisition sensor; b) activating the processor to acquire a pre-trigger image of the mark prior to activation of the trigger; c) analyzing the pre-trigger image, and based on the analyzing; d) calculating a pre-trigger acquisition parameter; e) adjusting the image acquisition sensor using the calculated pre-trigger acquisition parameter; f) repeating steps b) through e) until the trigger is activated; g) after the trigger is activated, acquiring a post-trigger image of the mark using the calculated pre-trigger acquisition parameter; and h) decoding the post-trigger image.

To the accomplishment of the foregoing and related ends, the invention, then, comprises the features hereinafter fully described. The following description and the annexed drawings set forth in detail certain illustrative embodiments of the invention. However, these embodiments are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
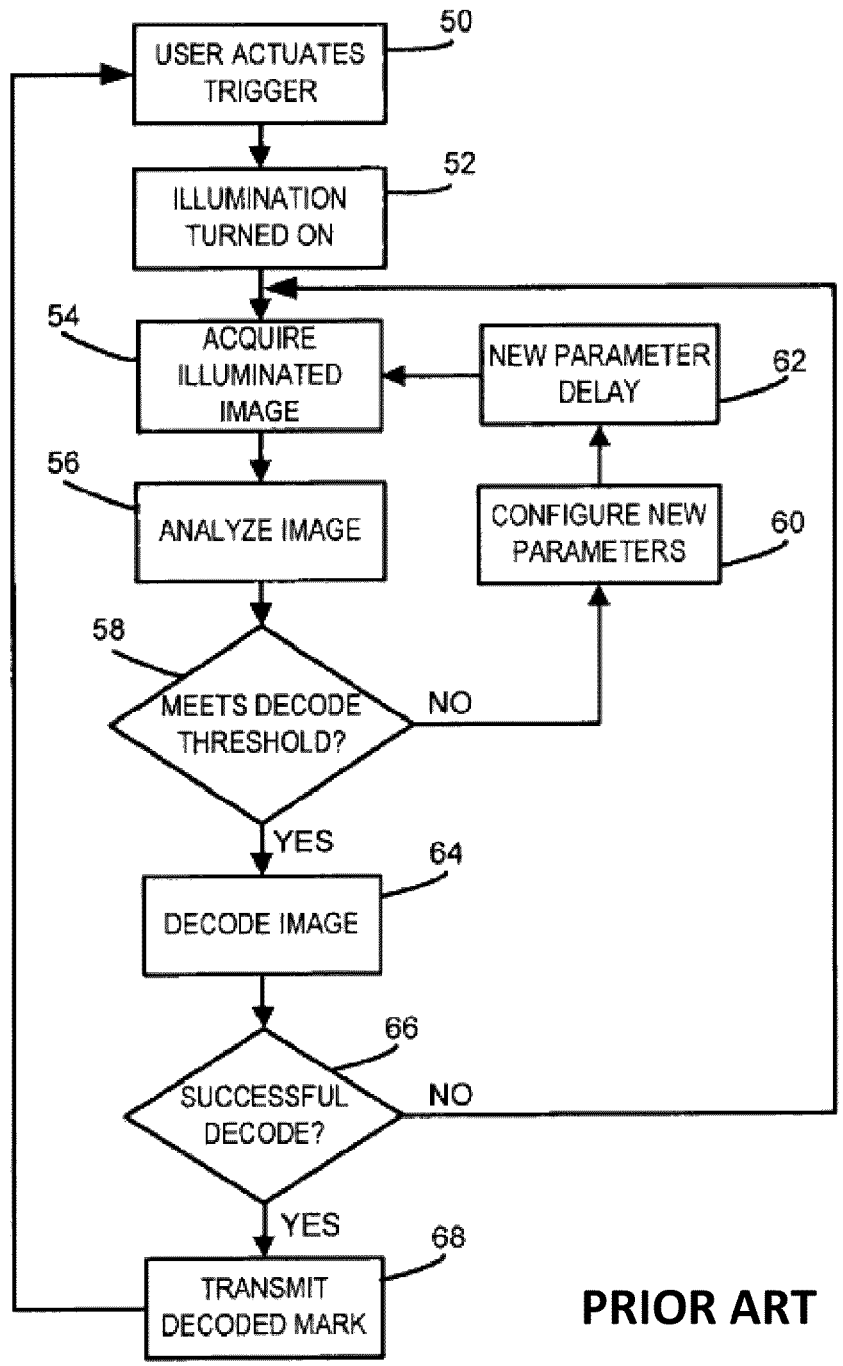
FIG. 1 is a flowchart illustrating a method wherein a reader cycles through a known image decoding process.

Referring to the drawings wherein like reference numerals correspond to similar elements throughout the views, and more specifically, referring to FIG. 2, the present embodiments will be described in the context of an exemplary symbology reader system 100 adapted for handheld operation. The exemplary handheld system is provided with a reader handpiece 102. The handpiece 102 includes a grip section 104 and a body section 106. An image formation system 108, shown in phantom, can be controlled and can direct image data to an onboard embedded processor 110. This processor can include a scanning software application 112 by which illumination may be controlled, images may be acquired and image data may be interpreted, i.e., decoded, into usable information derived from the marks (such as the depicted two-dimensional mark 114). Usable information may include alphanumeric strings, binary data, and binary data along with interpretation information, such as a flag to indicate the binary data should be interpreted as Kanji character data, as non-limiting examples. The decoded information can be directed via a cable 116 or wireless link to a PC or other data storage and/or processing device 118 (e.g., computer, programmable logic controller) having, for example, a display 120, keyboard 122 and mouse 124, where it can be stored and further manipulated using an appropriate application 126.

Alternatively, the cable 116 can be directly connected to an interface (e.g., a USB port) in the reader 102 and an appropriate interface in the computer 118, or the cable 116 may be replaced with a wireless link. In some embodiments, the computer-based application 126 may perform various image interpretation/decoding and illumination control functions as needed. The precise arrangement of the handheld scanning appliance with respect to an embedded processor, computer or other processor is highly variable. For example, a wireless interconnect can be provided in which no cable 116 is present. Likewise, the depicted microcomputer can be substituted with another processing device or multiple processing devices, including an onboard processor(s) or a miniaturized processing unit such as a personal digital assistant or other small-scale computing device.

The scanning application 112 can be adapted to respond to inputs from the reader 102. For example, when the operator toggles a trigger 128, such as a manual trigger on the handheld reader 102, illumination source 130 may be turned ON, and an internal image sensor 132 (within the image formation system 108) may acquire an image of a region of interest 134 on an object 136. The exemplary region of interest includes a two-dimensional mark 114 (as a non-limiting example) that can be used to identify the object 136. Identification and other processing functions may be carried out by the scanning application 112, based upon image data transmitted from the handheld reader 102 to the processor 110. A visual indicator 138 can be illuminated by signals from the processor 110 to indicate a successful read and decode of the mark 114. Audible indicators may also be activated to indicate associated events.

According to one aspect of the embodiments described herein, the exemplary scanning system 100 may be configured to reduce the trigger-to-decode time by acquiring and processing images before the user actuates the trigger 128. In one embodiment, prior to the user actuating the trigger, the reader is configured to enter a feedback loop mode (described further below) with the illumination OFF (i.e., relying on ambient light) and acquires one or more pre-trigger images. In one embodiment, when the user then actuates the trigger, one or more post-trigger images may also be acquired using the settings determined with only the ambient light. This post-trigger image(s) may then be processed by the decoder, while at the same time (e.g., in parallel) the illumination may be turned ON and a post-trigger feedback loop may begin. As used herein, it is to be appreciated that "in parallel" may define a process that is truly in parallel if hardware supported, such as with multiple processors or a multi-core processor, or in parallel may define a process that is interleaved with another process, such as where only one processor may be executing both processes. For marks that may be easily decoded in ambient light (e.g., typical label based codes) the pre-trigger image and/or post-trigger image may be able to be decoded with the illumination ON without revising the settings derived from the post-trigger feedback loop, also giving a reduced trigger-to-decode time.

Figure 2:
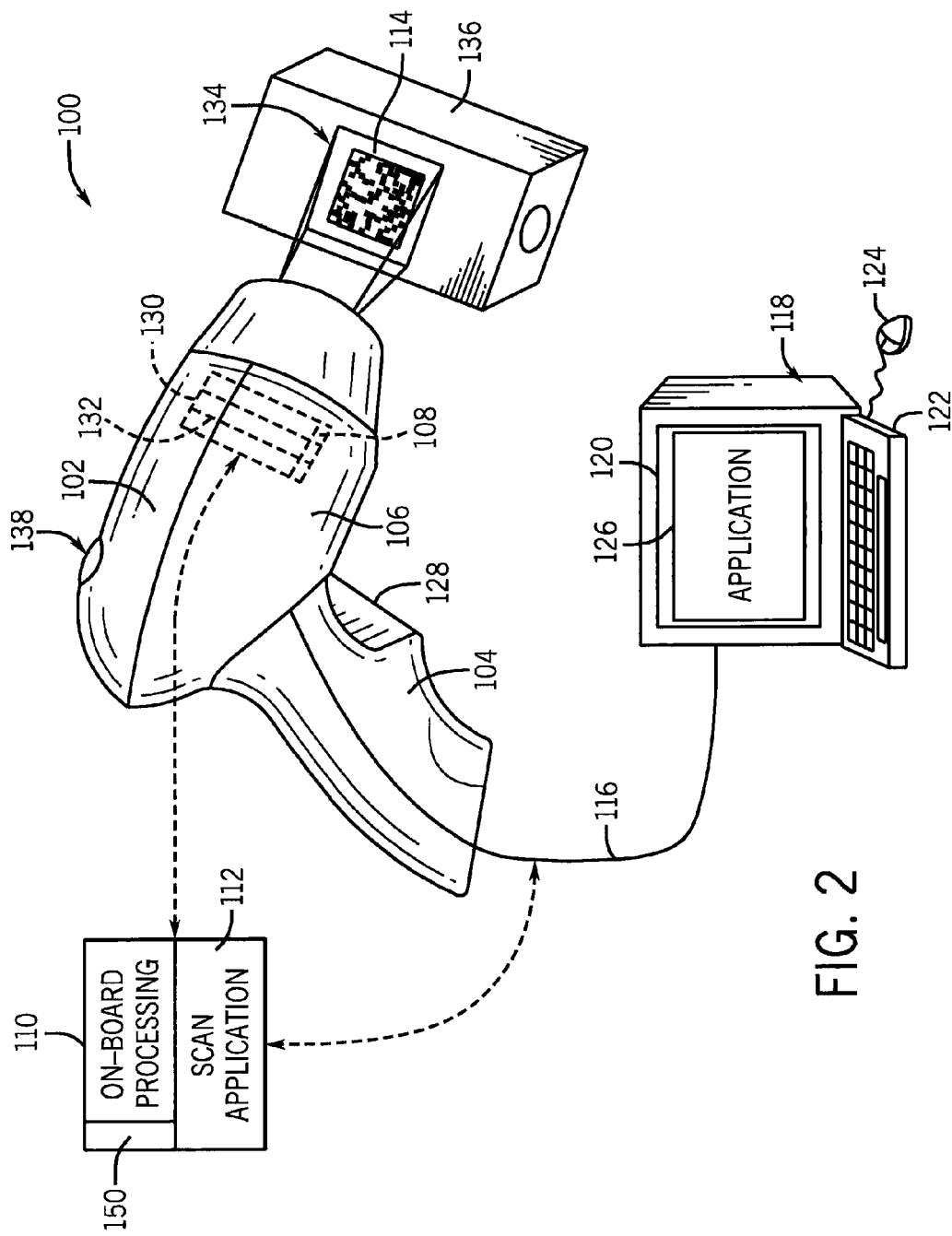
FIG. 2 is a perspective view of a handheld reader constructed in accordance with embodiments of the present invention.
Figure 3:
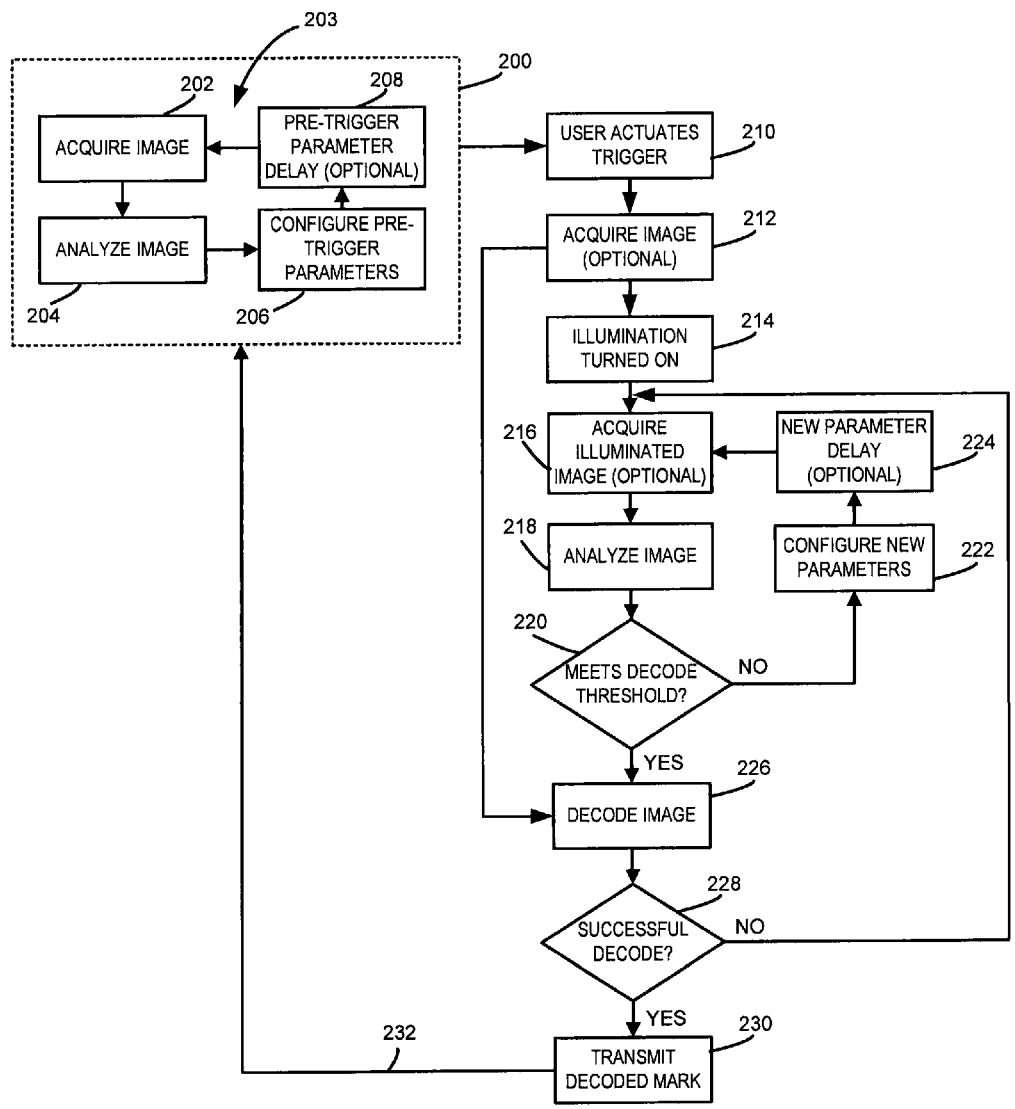
FIG. 3 is a flow chart illustrating an improved method whereby a reader constructed in accordance with embodiments of the present invention cycles through an image decoding process where the time between activation of the reader's trigger and the reader returning a successful decode response is reduced.

Referring to FIGS. 2 and 3, an exemplary method of the image decoding process with the scanning system 100 is illustrated, with a system and method being configured to reduce the trigger-to-decode time. After the scanning system 100 is initially turned ON, and prior to activation of the trigger 128, the reader 102 may default to a pre-trigger feedback loop mode with illumination turned OFF, as indicated at process block 200. Hereinafter, the term "feedback loop" is used generally to refer to a calculation and/or process, e.g., a feedback loop, used for image acquisition, image analysis, and/or system parameter adjustments based on the image analysis. Within the pre-trigger feedback loop mode process block 200, an exemplary feedback loop is shown to comprise a feedback loop 203 including an image acquisition process block 202, an image analysis process block 204, a pre-trigger parameter configuration process block 206, and a pre-trigger parameter delay process block 208. Processor 110, such as a DSP (Digital Signal Processor) or other known processors, executes a predetermined algorithm on the pre-trigger image data acquired at process block 202 to analyze the image, as indicated at process block 204. Based on the analysis, the algorithm may calculate desired system parameters, including, for example, exposure, gain, focus, and/or illumination types, and determines if modifications may be needed to any of the pre-trigger parameters, as indicated at process block 206. As indicated at process block 208, a time delay may be added to allow for the new parameters to take effect.

In one embodiment, the feedback loop 203 of the pre-trigger feedback loop mode process block 200 may be an endless loop up until the user actuates the trigger, for example, and in other embodiments, the feedback loop 203 may be configured to loop for a predetermined number of loop(s), such as one or more than one loop, or for example, until the image analysis determines no new pre-trigger parameter adjustments are needed.

Still referring to FIGS. 2 and 3, with the pre-trigger feedback loop mode process block 200 actively looping, or having looped for a number of loop(s), the user initiates an image decoding process by actuating the trigger 128 on the handheld reader 102, as indicated at process block 210. By actuating the trigger 128, in one optional embodiment, the reader may first acquire one or more post-trigger image(s) at process block 212 again without illumination. In another optional embodiment, by actuating the trigger 128, the reader may omit process block 212 and first acquire one or more post-trigger image(s) at process block 216 after illumination source 130 has been turned ON at process block 214. It is to be appreciated that additional post-trigger images may be acquired after acquiring at least one image at process block 212 and/or 216, and may be acquired with illumination ON or OFF. Once acquired, the image from process block 212, or optionally from process block 216, may be attempted to be decoded or analyzed for the presence of encoded data, as indicated at process block 226.

In yet an additional optional embodiment, in parallel to the attempted decode of the post-trigger image from process block 212, simultaneously with, or in advance of acquisition of the image, illumination source 130 may be turned ON at process block 214 to illuminate the region of interest 134. Next, the reader acquires an illuminated image of the mark, as indicated at process block 216. In some embodiments, the illuminated image may be acquired using at least one of the pre-trigger parameters calculated in the feedback loop 203, such as a pre-calculated focus setting, as a non-limiting example. In any of the embodiments herein, the illumination source 130 can be integrated with the image formation system's 108 standard operating functions, such as strobe and trigger mechanisms, or it can be controlled via the scanning application 112. Optionally, in addition to acquiring the image, the sensed image may be transferred to external memory (e.g., SDRAM).

Next, processor 110, or possibly a separate processor, may execute a predetermined algorithm on the image data to analyze the image, as indicated at process block 218. Thereafter, optionally a determination may be made if the image data is acceptable (e.g., meets predetermined threshold values for contrast or sharpness, for example) to attempt a decoding of the image data, or if modifications may be needed to the system parameters (e.g., exposure/gain) and/or other reader parameter settings (e.g., focus, illumination), as indicated at decision block 220. If modifications are needed, the sensor and/or other reader parameter settings may be updated with the new post-trigger parameters, as indicated at process block 222. As indicated at process block 224, a time delay may need to be inserted for the new parameters to take effect e.g., a rolling shutter sensor may need to complete one readout from every sensor line (i.e., row of pixels).

The process of acquiring an image with illumination ON may be repeated at process block 216, now with the new parameters, and again, the algorithm may determine if the image data may be acceptable to attempt a decoding of the image data. If the image data is now acceptable, the image data may be decoded or analyzed for the presence of encoded data, as indicated at process block 226.

As indicated at decision block 228, if the decoding step does not result in a decoded image, the process typically returns to process block 216 to acquire another illuminated image for analysis. This process can be repeated as many times as required to decode the image, or until the user releases the trigger, or until a timeout condition occurs, for example. After data encoded within the mark is found and successfully decoded, the reader typically will transmit/indicate the decoded data by outputting the decoded data (or a variation thereof), and/or actuating some form of user feedback such as a beeper and/or status lights, and turn the illumination OFF, as indicated at process block 230. At this point, the reader 102 may be configured to return 232 to process block 200 for non-illuminated pre-trigger feedback loop cycle(s).

According to another aspect of the embodiments, and still referring to FIG. 3, the pre-trigger parameters configured in process block 206 may comprise pre-trigger parameters based on ambient light, i.e., with the illumination OFF, along with other pre-trigger parameters, such as exposure, gain, focus, etc. In this way, the pre-trigger parameters may be stored separately from the post-trigger parameters configured in process block 222, which may be based on an illuminated image, i.e., with illumination ON, along with other post-trigger parameters, such as exposure, gain, focus, etc., and the pre-trigger parameters would not be used during the calculation and configuration of the post-trigger parameters. This may help to avoid any interference with configuring parameters in both process block 206 and process block 222.

Figure 4:
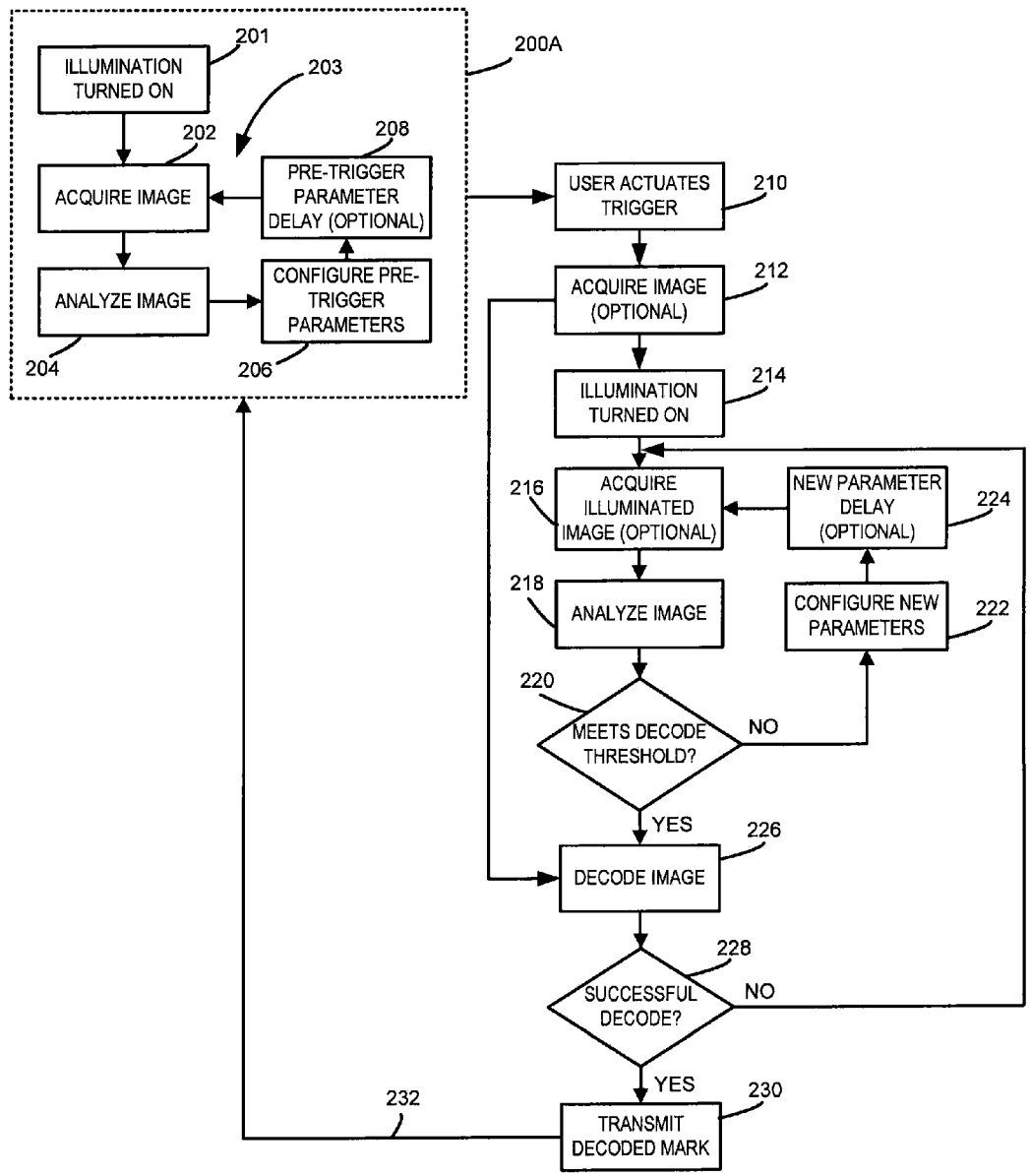
FIG. 4 is a flow chart illustrating an optional method usable with the embodiments of the invention.

According to another aspect of the embodiments, the non-illuminated pre-trigger feedback loop mode process 200 of FIG. 3 may be modified, as indicated at process block 200A in FIG. 4. As can be seen, process block 200A includes optional process block 201, where illumination may be turned ON and used during the pre-trigger feedback loop mode. Turning the illumination ON may provide benefits. For example, a user of the reader 102 may perceive the illumination as feedback of the reader attempting to process (decode) a mark. In addition, with the illumination ON, the image acquired during the pre-trigger feedback loop mode process 200A may be in a better condition for immediate decoding, as indicated at process block 226 in FIG. 3.

Figure 5:
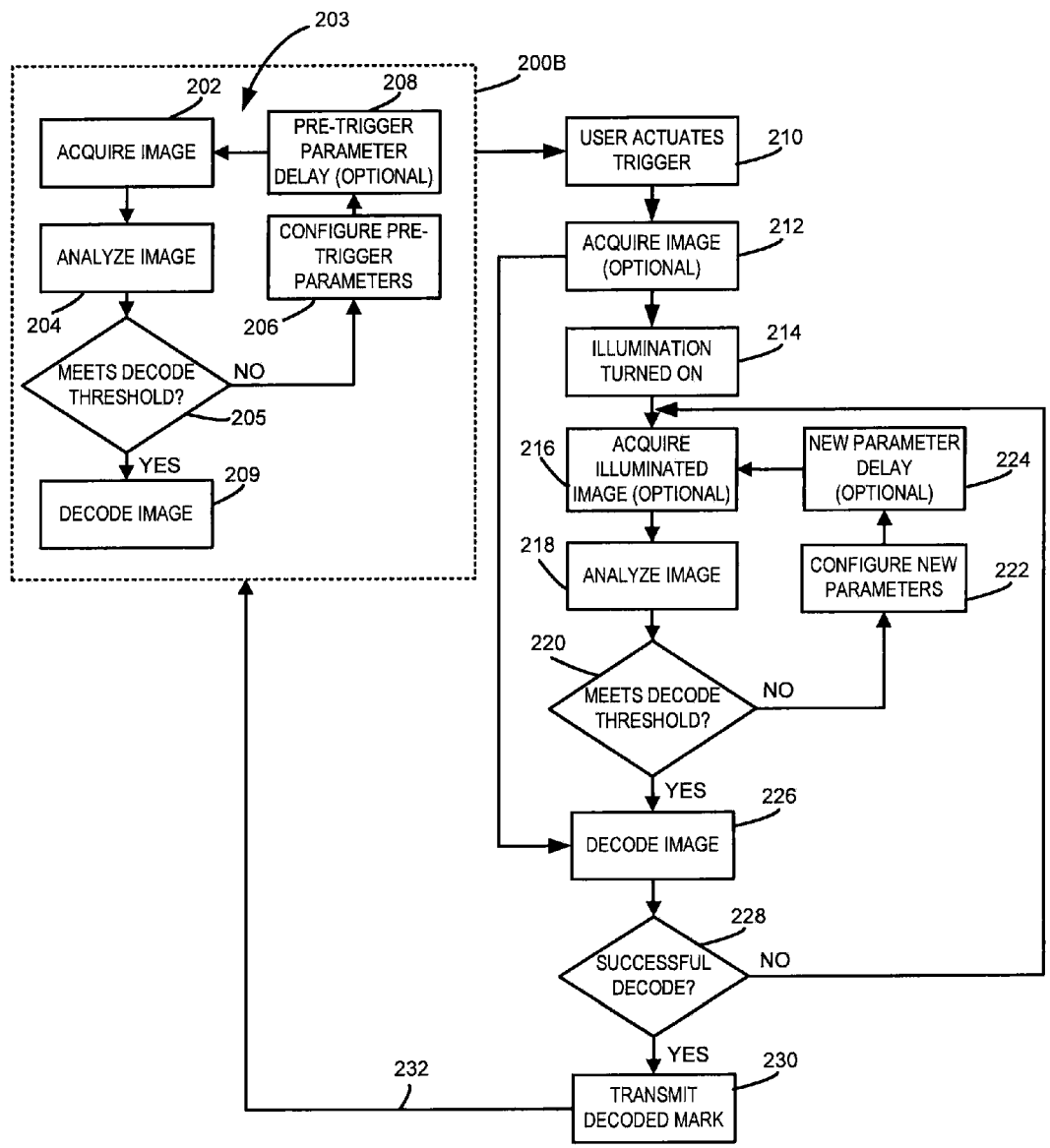
FIG. 5 is a flow chart illustrating an additional optional method usable with embodiments of the invention.

According to another aspect of the embodiments, the non-illuminated pre-trigger feedback loop mode process 200 of FIG. 3 may be modified, as indicated at process block 200B in FIG. 5. In addition to analyzing the image at process block 204, the processor 110 may further calculate if the image data may be acceptable (e.g., meets predetermined threshold values for contrast or sharpness, for example) and is in a condition for an attempt to decode the image data, as indicated at decision block 205. In addition to or in place of process block 204 and/or 205, the image data may be decoded or analyzed for the presence of encoded data, as indicated at process block 209. If modifications to the pre-trigger parameters are still needed, the parameter settings may be updated with the new pre-trigger parameters based on information from the image analysis of process block 204 and/or the attempted image decode of process block 209, as indicated at process block 206.

In addition, in some embodiments, the information from the image analysis of process block 204 and/or the attempted image decode of process block 209 may be used to optimize the post-trigger image acquisition (such as process blocks 212 through 224), and the image decode of process block 226. Information such as the type of mark, orientation, scale, polarity, etc. may be advantageously utilized to improve the time spent to attempt the decode.

In some further embodiments, the decoded data from process block 209 may be used to assist in the determination of a confidence level of the image decode of process block 226. Improved confidence of a decode may be advantageous as it helps to avoid potentially reporting incorrect data.

Figure 6:
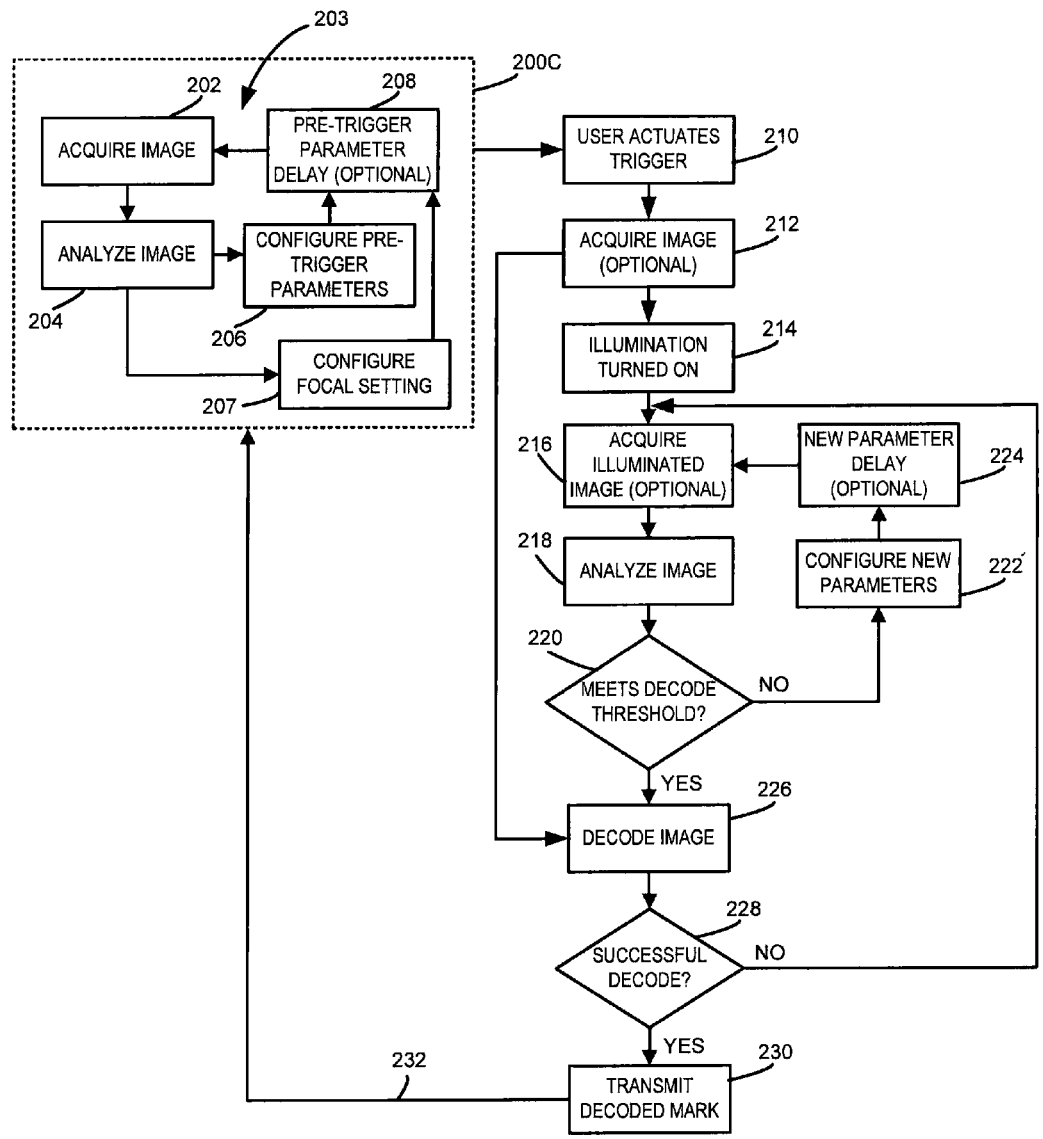
FIG. 6 is a flow chart illustrating an additional optional method usable with embodiments of the invention.

According to another aspect of the embodiments, feedback loop processes described herein, including for example, illumination OFF and ON, may be modified, as indicated at process block 200C in FIG. 6. As can be seen, process block 200C includes optional process block 207 in parallel with process block 206. It is to be appreciated that process block 207 may also be in series within the pre-trigger feedback loop 203, and need not be in parallel with process block 206. Process block 207 may utilize the image analysis to calculate or predict a focal setting for an adjustable component, such as a lens or a mirror in the optical path. In this way, when the user actuates the trigger at process block 210 (see FIG. 3), the focus setting may have already been configured and may avoid additional delay with further focus setting adjustments.

In various embodiments as described herein, a variable lens element may be used, known as a liquid lens. The liquid lens is an optical device that can change focus position based on an applied voltage to a fluid or gel bounded by a flexible polymer, which changes the shape of the lens. Lens response times are typically 20-50 ms. When combined with standard lenses, the liquid lens can focus from device contact to infinity.

Other focal configurations are contemplated as well. For example, a lens or lenses may be incorporated where movement of the lens or lenses may be accomplished using small motors and/or voice coils and/or piezoelectric systems. Other variable lens elements may also be used, for example, by changing the refractive index of a transparent material.

In various embodiments as described herein, it should be understood that the type of data that may be read and captured by the image sensor 132 is not limited to bar codes or other such symbols. In the various embodiments described herein, unless otherwise specified, any type of symbols, characters, or pictures (e.g., driver's license photos), or other data may be captured by the image sensor 132. Where such data is amenable to decoding, the processor 110 of the reader 102 may attempt to decode it; alternatively, the data may be passed along for processing by an inspection system, an optical character recognition system, a host system, or stored locally or remotely for later read-out, as non-limiting examples.

It should be noted that the various features described herein, including use of separate pre- and post-trigger parameters, feedback loops with illumination OFF and ON, adjustable lens with illumination OFF and ON, and the like, may each be used independently or in various combinations with one another, and may be user selectable or non-selectable features, and may also comprise one or more system operating modes.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

Thus, the invention is to cover all modifications, equivalents, and alternatives falling within the spirit and scope of the invention as defined by the following appended claims.

What is claimed is:

1. A handheld mark reader comprising:
    the reader having a manual trigger;

an image acquisition sensor that acquires at least one pre-trigger image of the mark prior to an actuation of the manual trigger and acquires at least one post-trigger image of the mark after the actuation of the manual trigger;

a pre-trigger calculation process that calculates, for the at least one pre-trigger image, at least one pre-trigger image parameter including at least one of a gain and a focal setting;

a decode process that decodes the at least one post-trigger image; and a feedback process that uses the at least one pre-trigger image parameter to control at least one of a post-trigger image acquisition process and the decode process.

2. The handheld mark reader according to claim 1 wherein the feedback process comprises a pre-trigger feedback loop that determines the at least one pre-trigger image parameter prior to the actuation of the trigger.

3. The handheld mark reader according to claim 2 wherein the pre-trigger feedback loop comprises an image acquisition process, an image analysis process, and a configure pre-trigger parameters process.

4. The handheld mark reader according to claim 1 further including a post-trigger image acquisition process that uses the at least one pre-trigger image parameter to acquire the at least one post-trigger image.

5. The handheld mark reader according to claim 1 wherein the at least one pre-trigger image parameter further includes exposure.

6. The handheld mark reader according to claim 1 wherein the focal setting pre-trigger image parameter comprises an auto-focus parameter.

7. The handheld mark reader according to claim 1 wherein the focal setting pre-trigger image parameter comprises a focal setting for a liquid lens.

8. A handheld mark reader for reading a mark comprising:
a reader body supporting a manual trigger and an image acquisition sensor, the sensor configured to acquire a pre-trigger image of the mark and a post-trigger image of the mark;
a pre-trigger image acquisition process;
a first pre-trigger calculation process that calculates, for the pre-trigger image, at least one parameter of exposure and gain;
a first decode process that attempts to decode the pre-trigger image prior to operation of the manual trigger;
a post-trigger image acquisition process;
a second decode process that attempts to decode the post-trigger image; and
a feedback process that uses the first calculated at least one parameter to control at least one of the post-trigger image acquisition process and the second decode process.

9. The handheld mark reader according to claim 8 wherein an illumination source is OFF during the pre-trigger image acquisition process.

10. The handheld mark reader according to claim 8 wherein an illumination source is OFF during the pre-trigger image acquisition process and ON during the post-trigger image acquisition process.

11. The handheld mark reader according to claim 8 wherein an illumination source is turned ON prior to the pre-trigger image acquisition process.

12. The handheld mark reader according to claim 8 further including a second pre-trigger calculation process that calculates, for the pre-trigger image, at least one of contrast and sharpness.

13. The handheld mark reader according to claim 8 wherein the first pre-trigger calculation process comprises a feedback loop including an image acquisition process, an image analysis process, and a configure pre-trigger parameters process.

14. The handheld mark reader according to claim 13 wherein information from at least one of the image analysis process and the first decode process is used to optimize the post-trigger image acquisition process.

15. The handheld mark reader according to claim 13 wherein information from the first image decode process is used in a determination of a confidence level of the second decode process.

16. A mark reader for decoding an image, the reader comprising:
a body;
an imager sensor within the body, the image sensor configured to acquire a pre-trigger image of at least a portion of a mark;
the body having a manually operable trigger, the trigger configured to activate the image sensor to acquire a post-trigger image of the at least a portion of the mark;
a processor operatively coupled to the trigger and the image sensor, the processor configured to activate the image sensor prior to operation of the trigger to acquire the pre-trigger image of the at least a portion of the mark and to calculate, for the pre-trigger image acquired prior to operation of the trigger, at least one of auto-exposure, auto-gain, auto-focus, and image decode; and
the processor further configured to decode the post-trigger image acquired after activation of the trigger using at least one of the calculated auto-exposure, auto-gain, auto-focus, and image decode.

17. The mark reader according to claim 16 further including a pre-trigger feedback loop for determining pre-trigger image parameters based on a non-illuminated pre-trigger image, and a post-trigger feedback loop for calculating post-trigger image parameters based on an illuminated post-trigger image.

18. The mark reader according to claim 16 wherein the pre-trigger image parameters are used for a first post-trigger image acquisition, and the post-trigger image parameters are used for subsequent post-trigger image acquisitions.

19. A method for decoding an image of a mark using a handheld mark reader, the reader including a trigger configured to initiate an acquisition of the image of the mark, the method comprising:
a) providing a processor, the processor operatively coupled to the trigger and to an image acquisition sensor;
b) activating the processor to acquire a pre-trigger image of the mark prior to actuation of the trigger;
c) analyzing the pre-trigger image, and based on the analyzing;
d) calculating a pre-trigger acquisition parameter including one or more of a gain and a focal setting;
e) adjusting the image acquisition sensor using the calculated pre-trigger acquisition parameter;
f) repeating steps b) through e) until the trigger is actuated;
g) after the trigger is actuated, acquiring a post-trigger image of the mark using the calculated pre-trigger acquisition parameter; and
h) decoding the post-trigger image.

20. The method according to claim 19 further including turning an illumination source ON after the trigger is actuated.

21. The method according to claim 19 further including, before the trigger is actuated, determining if the pre-trigger image meets predetermined image threshold values.

22. The method according to claim 19 further including, before the trigger is actuated, attempting to decode the pre-trigger image.

23. The method according to claim 19 wherein the pre-trigger acquisition parameter includes a focal setting for an adjustable lens.

24. The method according to claim 19 wherein the pre-trigger acquisition parameter includes a focal setting for a liquid lens.

25. The method according to claim 19 wherein the pre-trigger parameter comprises an auto-focus parameter.

* * * * *